(12) United States Patent  (10) Patent No.: US 7,966,835 B2
Petrovski  (45) Date of Patent: *Jun. 28, 2011

(54) THERMAL MODULE FOR CLIMATE-CONTROLLED SEAT ASSEMBLIES

(75) Inventor: Dusko Petrovski, Washington, MI (US)

(73) Assignee: Amerigon Incorporated, Northville, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/559,087

(22) Filed: Sep. 14, 2009

(65) Prior Publication Data

US 2010/0001558 A1 Jan. 7, 2010

Related U.S. Application Data

(63) Continuation of application No. 11/047,077, filed on Jan. 31, 2005, now Pat. No. 7,587,901.

(60) Provisional application No. 60/637,725, filed on Dec. 20, 2004.

(51) Int. Cl.
*F25B 21/02* (2006.01)
(52) U.S. Cl. .......................................... 62/3.3
(58) Field of Classification Search ............ 62/3.3, 62/3.61, 3.7, 261
See application file for complete search history.

(56) References Cited

U.S. PATENT DOCUMENTS

| 3,136,577 A | 6/1964 | Richard |
| 3,137,523 A | 6/1964 | Karner |
| 4,413,857 A | 11/1983 | Hayashi |
| 4,671,567 A | 6/1987 | Frobose |
| 4,685,727 A | 8/1987 | Cremer et al. |
| 5,002,336 A | 3/1991 | Feher |
| 5,088,790 A | 2/1992 | Wainwright et al. |
| 5,106,161 A | 4/1992 | Meiller |
| 5,117,638 A | 6/1992 | Feher |
| 5,385,382 A | 1/1995 | Single, II et al. |
| 5,505,520 A | 4/1996 | Frusti et al. |
| 5,524,439 A | 6/1996 | Gallup et al. |
| 5,597,200 A | 1/1997 | Gregory et al. |
| 5,623,828 A | 4/1997 | Harrington |
| 5,626,021 A | 5/1997 | Karunasiri et al. |

(Continued)

FOREIGN PATENT DOCUMENTS

DE 19503291 8/1996

(Continued)

OTHER PUBLICATIONS

International Search Report for Application No. PCT/US2005/045986 (the PCT counterpart of the parent application) mailed Apr. 28, 2006.

(Continued)

*Primary Examiner* — Melvin Jones
(74) *Attorney, Agent, or Firm* — Knobbe, Martens, Olson & Bear, LLP

(57) ABSTRACT

A climate control device includes a first and a second thermal module. The first module is configured to provide climate conditioned air to a first portion of a seat. The second module is configured to provide climate conditioned air to a second portion of the seat. A control system is provided for controlling the climate control device. The control system includes an input device for providing a set point for the system. A first control unit of the control system is provided for the first thermal module and a second control unit is provided for the second thermal module.

36 Claims, 8 Drawing Sheets

U.S. PATENT DOCUMENTS

| | | | |
|---|---|---|---|
| 5,924,766 | A | 7/1999 | Esaki et al. |
| 5,927,817 | A | 7/1999 | Ekman et al. |
| 5,934,748 | A * | 8/1999 | Faust et al. ............... 297/180.12 |
| 6,003,950 | A | 12/1999 | Larsson |
| 6,019,420 | A | 2/2000 | Faust et al. |
| 6,059,018 | A | 5/2000 | Yoshinori et al. |
| 6,062,641 | A | 5/2000 | Suzuki et al. |
| 6,079,485 | A | 6/2000 | Esaki et al. |
| 6,119,463 | A | 9/2000 | Bell |
| 6,145,925 | A | 11/2000 | Eksin et al. |
| 6,186,592 | B1 | 2/2001 | Orizaris et al. |
| 6,189,966 | B1 | 2/2001 | Faust et al. |
| 6,196,627 | B1 | 3/2001 | Faust et al. |
| 6,206,465 | B1 | 3/2001 | Faust et al. |
| 6,223,539 | B1 | 5/2001 | Bell |
| 6,509,704 | B1 | 1/2003 | Brown |
| RE38,128 | E | 6/2003 | Gallup et al. |
| 6,598,251 | B2 | 7/2003 | Habboub et al. |
| 6,604,785 | B2 | 8/2003 | Bargheer et al. |
| 6,606,866 | B2 | 8/2003 | Bell |
| 6,619,736 | B2 | 9/2003 | Stowe et al. |
| 6,626,488 | B2 | 9/2003 | Pfahler |
| 6,644,735 | B2 | 11/2003 | Bargheer et al. |
| 6,676,207 | B2 | 1/2004 | Rauh et al. |
| 6,695,402 | B2 | 2/2004 | Sloan, Jr. |
| 6,700,052 | B2 | 3/2004 | Bell |
| 6,761,399 | B2 | 7/2004 | Bargheer et al. |
| 6,786,541 | B2 | 9/2004 | Haupt et al. |
| 6,786,545 | B2 | 9/2004 | Bargheer et al. |
| 6,808,230 | B2 | 10/2004 | Buss et al. |
| 6,828,528 | B2 | 12/2004 | Stowe et al. |
| 6,841,957 | B2 | 1/2005 | Brown |
| 6,857,697 | B2 | 2/2005 | Brennan et al. |
| 6,893,086 | B2 | 5/2005 | Bajic et al. |
| 6,976,734 | B2 | 12/2005 | Stoewe |
| 7,070,232 | B2 | 7/2006 | Minegishi et al. |
| 7,108,319 | B2 | 9/2006 | Hartwich et al. |
| 7,114,771 | B2 | 10/2006 | Lofy et al. |
| 7,201,441 | B2 | 4/2007 | Stoewe et al. |
| 7,426,835 | B2 | 9/2008 | Bell et al. |
| 2001/0028185 | A1 | 10/2001 | Stowe et al. |
| 2004/0090093 | A1 | 5/2004 | Kamiya et al. |
| 2004/0164594 | A1 | 8/2004 | Stoewe et al. |
| 2004/0195870 | A1 | 10/2004 | Bohlender |
| 2005/0285438 | A1 | 12/2005 | Ishima et al. |
| 2006/0087160 | A1 | 4/2006 | Dong et al. |
| 2007/0262621 | A1 | 11/2007 | Dong et al. |

FOREIGN PATENT DOCUMENTS

| | | |
|---|---|---|
| DE | 299 11 519 U1 | 11/2000 |
| DE | 10115242 | 10/2002 |
| DE | 10238552 | 3/2003 |
| WO | WO 02/11968 | 2/2002 |
| WO | WO/03/014634 A1 | 2/2003 |
| WO | WO 03/051666 | 6/2003 |

OTHER PUBLICATIONS

Oct. 8, 2010 Amerigon Inc.'s Supplemental Answers to Interrogatory Nos. 1-5, 9-13, 15 of W.E.T.'s First Set of Interrogatories (Nos. 1-17).

May 24, 2010 W.E.T.'s Answer, Affirmative Defenses, and Counterclaims to Amerigon's Complaint for Patent Infringement.

Jun. 17, 2010 Amerigon's Inc.'s Answer to W.E.T. Automotive Systems Limited's counterclaims.

Jun. 17, 2010 Defendant Amerigon's Motion to Dismiss Count VII of Plaintiff W.E.T. Automotive Systems, Ltd.'s Counterclaims.

Jul. 8, 2010 W.E.T.'s Answer, Affirmative Defenses, and Counterclaims to Amerigon's (Corrected) Amended Answer and Counterclaims for Patent Infringement.

Jul. 16, 2010 W.E.T.'s Answer, Affirmative Defenses, and First Amended Counterclaims (Count VII) to Amerigon's (Corrected) Amended Answer and Counterclaims for Patent Infringement at D/E 19.

Jul. 16, 2010 W.E.T.'s Opposition to Amerigon's Motion to Dismiss W.E.T.'s Inequitable Conduct Counterclaim.

Aug. 2, 2010 Amerigon's Inc.'s Answer to W.E.T. Automotive Systems Limited's Amended Counterclaims.

Aug. 2, 2010 Defendant Amerigon Inc.'s Motion to Dismiss Amended Count VII of Plaintiff W.E.T. Automotive Systems Ltd.'s Amended Counterclaims.

Aug. 16, 2010 Plaintiff W.E.T.'s Responses to Defendant Amerigon Inc.'s First Set of Interrogatories (Nos. 1-5).

Aug. 24, 2010 W.E.T.'s Opposition to Amerigon's Motion to Dismiss Amended Count VII of Plaintiff W.E.T. Automotive Systems Ltd.'s Amended Counterclaims.

Aug. 27, 2010 Counterclaimant Amerigon Inc.'s Supplemental Answers to Counterclaim Defendant W.E.T.'s First Set of Interrogatories (Nos. 14-15).

Aug. 31, 2010 Defendant Amerigon Inc.'s Reply Brief in Support of Motion to Dismiss Amended Count VII of Plaintiff W.E.T. Automotive Systems' Amended Counterclaims.

Sep. 24, 2010 Amerigon Inc. And Feher Design, Inc.'s Preliminary Proposed Claim Constructions.

Sep. 24, 2010 W.E.T.'s Proposed Definitions.

Oct. 8, 2010 Plaintiff W.E.T.'s Supplemental Responses to Defendant Amerigon Inc.'s Interrogatories Nos. 1-5.

Nov. 11, 2010 W.E.T.'s Motion to Bifurcate and Stay.

Nov. 12, 2010 W.E.T.'s Motion for Summary Judgment of Inequitable Conduct.

Photographs and a description of two different components of a climate control seat assembly system sold prior to Dec. 20, 2003.

Photographs and a description of a component of a climate control seat assembly system sold prior to Dec. 20, 2003.

Dec. 16, 2010 Amerigon Inc.'s Notice of Conditional Withdrawal of Motion to Dismiss Amended Count VII of W.E.T. Automotive Systems Ltd.'s Amended Counterclaims.

European Office Action for corresponding European Patent Application No. 05854659.9 (Office Action mailed by the European Patent Office on Mar. 14, 2011).

Extended European Search Report for corresponding European Patent Application No. 10190975.2, which is a divisional of Euroepan Patent Application No. 05854659.9 (the Extended Search Report was mailed by the European Patent Office on Mar. 23, 2011).

* cited by examiner

THERMAL MODULE FOR CLIMATE-CONTROLLED SEAT ASSEMBLIES

CROSS-REFERENCE TO RELATED APPLICATIONS

This application is a continuation of U.S. patent application Ser. No. 11/047,077, filed Jan. 31, 2005, which claims the priority benefit under priority benefit under 35 U.S.C. §119(e) of U.S. Provisional Application No. 60/637,725, filed Dec. 20, 2004, the entireties of both of which are hereby incorporated by reference herein.

BACKGROUND

1. Field of the Inventions

This invention relates to climate control. More specifically, this invention relates to climate control of a seat.

2. Description of the Related Art

Temperature modified air for environmental control of living or working space is typically provided to relatively extensive areas, such as entire buildings, selected offices, or suites of rooms within a building. In the case of vehicles, such as automobiles, the entire vehicle is typically cooled or heated as a unit. There are many situations, however, in which more selective or restrictive air temperature modification is desirable. For example, it is often desirable to provide an individualized climate control for an occupant seat so that substantially instantaneous heating or cooling can be achieved. For example, an automotive vehicle exposed to the summer weather, where the vehicle has been parked in an unshaded area for a long period, can cause the vehicle seat to be very hot and uncomfortable for the occupant for some time after entering and using the vehicle, even with normal air conditioning. Furthermore, even with normal air-conditioning, on a hot day, the occupant's back and other pressure points may remain sweaty while seated. In the winter, it is highly desirable to have the ability to warm the seat of the occupant quickly to facilitate the occupant's comfort, especially where the normal vehicle heater is unlikely to warm the vehicle's interior as quickly.

For such reasons, there have been various types of individualized climate control systems for vehicle seats. Such climate control systems typically include a distribution system comprising a combination of channels and passages formed in the back and/or seat cushions of the seat. A thermal module conditions the climate of the air and delivers the conditioned air to the channels and passages. The climate conditioned air flows through the channels and passages to cool or heat the space adjacent the surface of the vehicle seat.

There are, however, drawbacks with existing climate control systems for seats. For example, some climate control systems are not easily integrated into existing seat construction methods. Such systems require a significantly greater number of parts as compared to existing automotive seats, and often require complex mechanical parts and/or electrical connections. In the past, this has resulted in increased costs for individualized occupant cooling in automobiles.

In particular, many advanced climate control systems allow the user to control individually the climate for each seat in the vehicle. In some systems, the user may also vary the climate between different portions of the seat. For example, the user may vary the climate settings between the seat cushion and the back cushion. In one arrangement, the user inputs the desired climate setting through an input or control switch. An intermediate control module interprets the signal from the control switch and generates control signals for a pair thermal modules, which are individually associated with the seat and back cushions. A set of power, control and signal wires extend between the thermal modules and the intermediate control module. These wires are used to control and drive the thermal modules to achieve the desired climate setting. In certain arrangements, seven or more wires may extend between the intermediate control modules and each thermal module. For one seat, therefore, there may be over fourteen wires extending between the intermediate control module and the climate control devices. These wires require a significant amount of space and complicate the design and layout of the climate control system.

Thus, there is a need for an improved climate control apparatus for a climate control system for seats.

SUMMARY

Accordingly, one aspect of the present invention involves a device for thermally conditioning and moving a fluid. The device includes a thermoelectric device to convert electrical energy into thermal energy producing a temperature change in response to an electrical current being applied thereto. A fluid transfer device produces a fluid flow that is in thermal communication with the thermoelectric device so that the thermal energy generated by the thermoelectric device is transferred to the fluid flow. A housing has an outlet and an inlet through which the fluid flow is directed. The thermoelectric device and the fluid transfer device are positioned at least partially within the housing. A sensor is configured to provide a temperature signal that is indicative of the temperature of the fluid flow. A control unit is coupled to the housing and is operatively connected to the sensor. The control unit is configured to receive a set point signal that is indicative of a desired temperature of the fluid flow based and configured to control the thermoelectric device and the fluid transfer device.

Another aspect of the present invention comprises a device for thermally conditioning and moving a fluid. The device includes a thermoelectric device to convert electrical energy into thermal energy producing a temperature change in response to an electrical current being applied thereto. A fluid transfer device produces a fluid flow that is in thermal communication with the thermoelectric device. A sensor is configured to provide a temperature signal that is indicative of the temperature of the fluid flow. A control unit is operatively connected to the sensor. The control unit is configured to receive a set point signal that is indicative of a desired temperature of the fluid flow and, based upon the set point signal and the temperature signal, to control the thermoelectric device and the fluid transfer device. The control unit is also configured to receive a second temperature signal from a second sensor. The second temperature signal is indicative of the temperature of the fluid flow within a second device for thermally conditioning and moving a fluid. The control unit is configured to control the second device based upon the set point signal and the second temperature signal so as to control the temperature and fluid flow within the second device.

Another aspect of the present invention comprises a climate controlled seat assembly that includes a seat cushion having a ventilation system. A main control unit is configured to generate a mode signal for the seat assembly. A first thermal module is configured to thermally condition air at a first portion of the ventilation system. A first sensor is configured to sense a condition of the first thermal module and to provide a condition signal corresponding to the sensed condition. A first control unit is operatively connected to the main control unit, the first sensor and the first thermal module. The first control unit is configured to drive the first thermal unit based upon the mode signal and the condition signal. A second thermal module is configured to thermally condition air at a second portion of the ventilation system. A second control unit is provided for the second thermal module. The first control unit is configured to control the second control unit based upon the mode signal and the condition signal.

Another aspect of the present invention involves a method for thermally conditioning a space adjacent a seat assembly. In the method, an input signal from an input device is transmitted to a control unit of a first thermal module. The first thermal module is controlled based at least in part upon the input signal to deliver thermally conditioned air to a first portion of a seat assembly. A control signal is transmitted from the control unit of the first thermal module to a control unit of a second thermal module so as to control the second thermal module and deliver thermally conditioned air to a second portion of the seat assembly based at least in part upon the input signal from the input device.

Another aspect of the present invention involves a climate controlled seat assembly that comprises a seat cushion, a main control unit, a first thermal module and a second thermal module. The seat cushion includes a ventilation system having a first portion and a second portion. The main control unit is configured to generate a mode signal for the seat assembly. The first thermal module is configured to thermally condition air that is delivered to the first portion of the ventilation system. The first thermal module comprises a first sensor configured to sense a condition of the first thermal module and to provide a condition signal corresponding to the sensed condition and a first control unit that is operatively connected to the main control unit, the first sensor and the first thermal module. The first control unit is configured to drive the first thermal unit based upon the mode signal and the condition signal of the first thermal module. The second thermal module that is configured to thermally condition air that is delivered to the second portion of the ventilation system. The second thermal module comprises a second sensor configured to sense a condition of the second thermal module and to provide a condition signal corresponding to the sensed condition and a second control unit that is operatively connected to the main control unit, the second sensor and the second thermal module. The second control unit is configured to drive the second thermal unit based upon the mode signal and the condition signal of the second thermal module.

Further features and advantages of the present invention will become apparent to those of ordinary skill in the art in view of the detailed description of preferred embodiments which follow, when considered together with the attached drawings and claims.

DETAILED DESCRIPTION OF THE PREFERRED EMBODIMENTS

Figure 1:
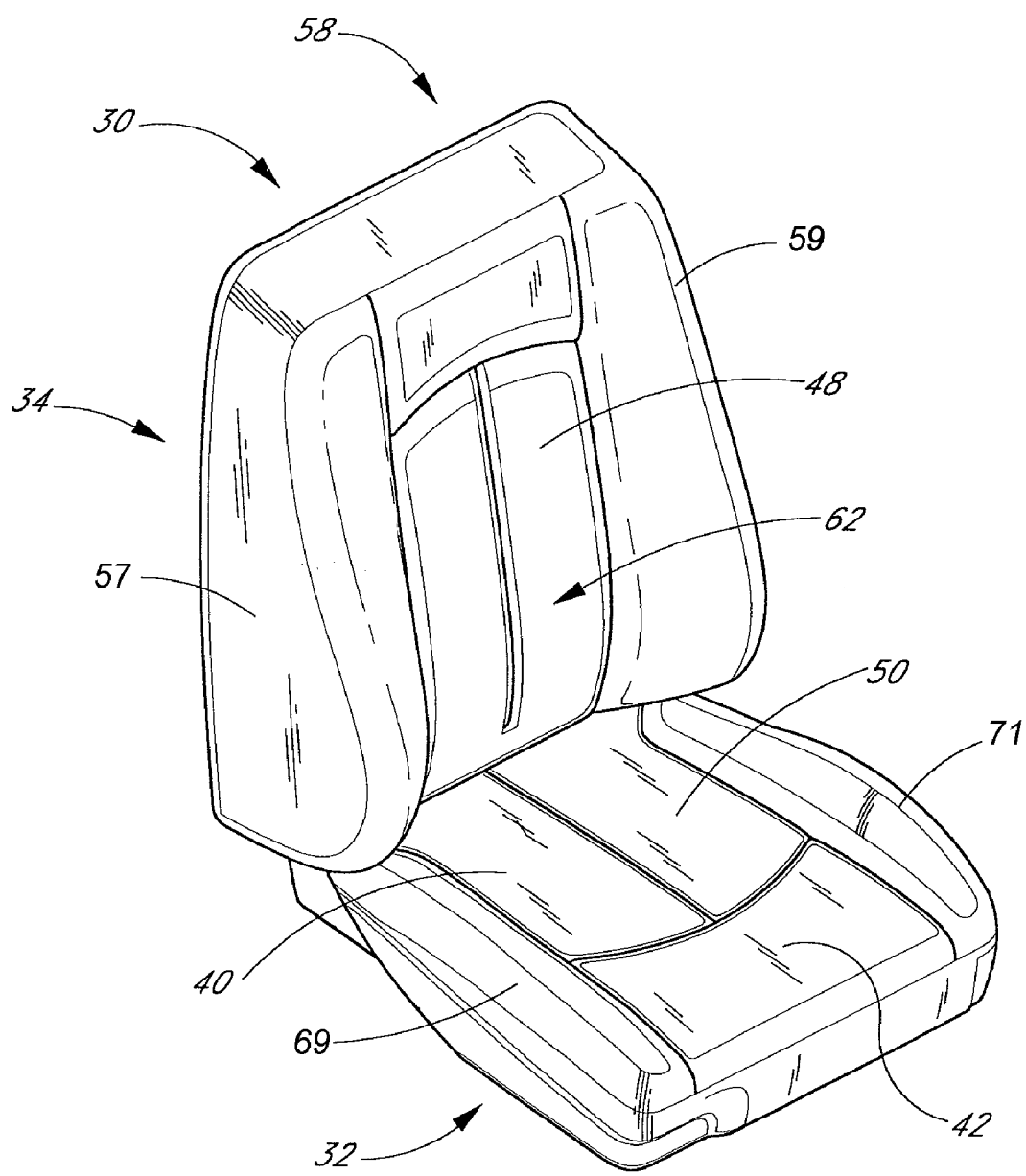
FIG. 1 is a perspective view of a vehicle seat assembly, which includes a climate control system that is configured in accordance with a preferred embodiment of the present invention.
Figure 2:
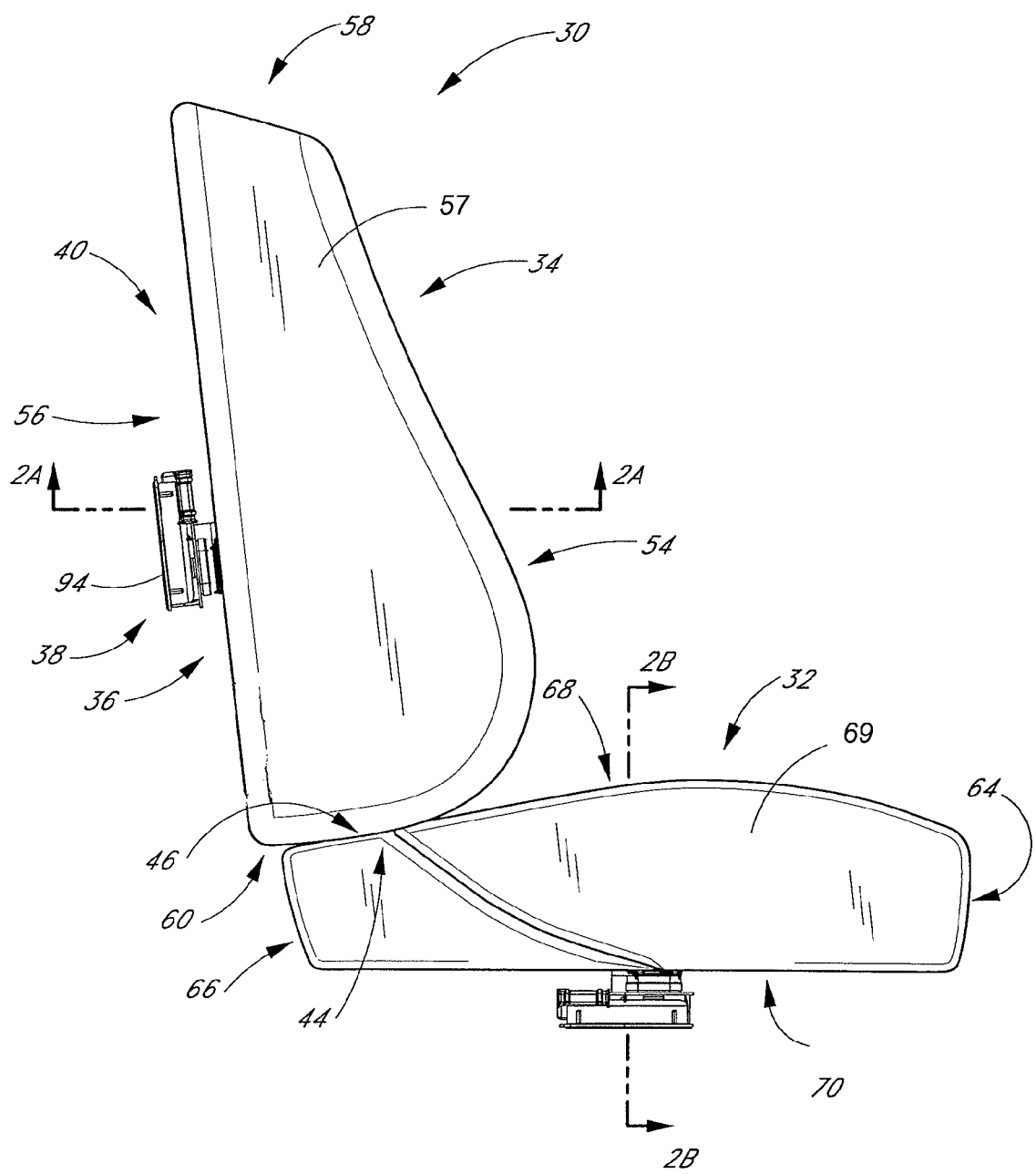
FIG. 2 is a side view of the vehicle seat assembly of FIG. 1.

FIGS. 1 and 2 illustrate an exemplary embodiment of a seat assembly 30 that comprises a seat 32 and a backrest 34. The seat assembly 30 includes a climate control system 36, which will be described in more detail below with reference to FIG. 4.

When an occupant sits in the seat assembly 30, the occupant's seat is located generally in a seat area 40 of the seat portion 32 and at least a portion of their legs are supported by a thigh area 42 of the seat portion 32. In this embodiment, a rear end 44 of the seat portion 32 is coupled to a bottom end 46 of the backrest portion 34. When the occupant sits in the seat assembly 30, the occupant's back contacts a front surface 48 of the backrest portion 34 and the occupant's seat and legs contact a top surface 50 of the seat portion 32. The surfaces 48, 50 cooperate to support the occupant in a sitting position. The seat assembly 30 can be configured and sized to accommodate occupants of various size and weight.

In the illustrated embodiment, the seat assembly 30 is similar to a standard automotive seat. However, it should be appreciated that certain features and aspects of the seat assembly 30 described herein may also be used in a variety of other applications and environments. For example, certain features and aspects of the seat assembly 30 may be adapted for use in other vehicles, such as, for example, an airplane, a boat, or the like. Further, certain features and aspects of the seat assembly 30 may also be adapted for use in stationary environments, such as, for example, a chair, a sofa, a theater seat, a mattress, and an office seat that is used in a place of business and/or residence.

With continued reference to FIGS. 1 and 2, the backrest 34 has a front side 54, a rear side 56, a top side 58 and a bottom side 60. The backrest 34 includes a pair of sides 57, 59 extending between the top side 58 and bottom side 60 for providing lateral support to the occupant of the seat assembly 30. A lumbar region 62 of the backrest 34 is generally positioned between the sides 57, 59 of the backrest 34 near the seat portion 32.

In a similar manner, the seat portion 32 has a front side 64, a rear side 66, a top side 68 and a bottom side 70. The seat portion 32 also includes a pair of sides 69, 71, which extending from the rear side 66 and the front side 64 for providing lateral support to the occupant of the seat assembly 30. In one embodiment, the seat assembly 30 is secured to a vehicle by attaching the bottom side 70 of the seat portion 32 to the floor of a vehicle.

Figure 2A:
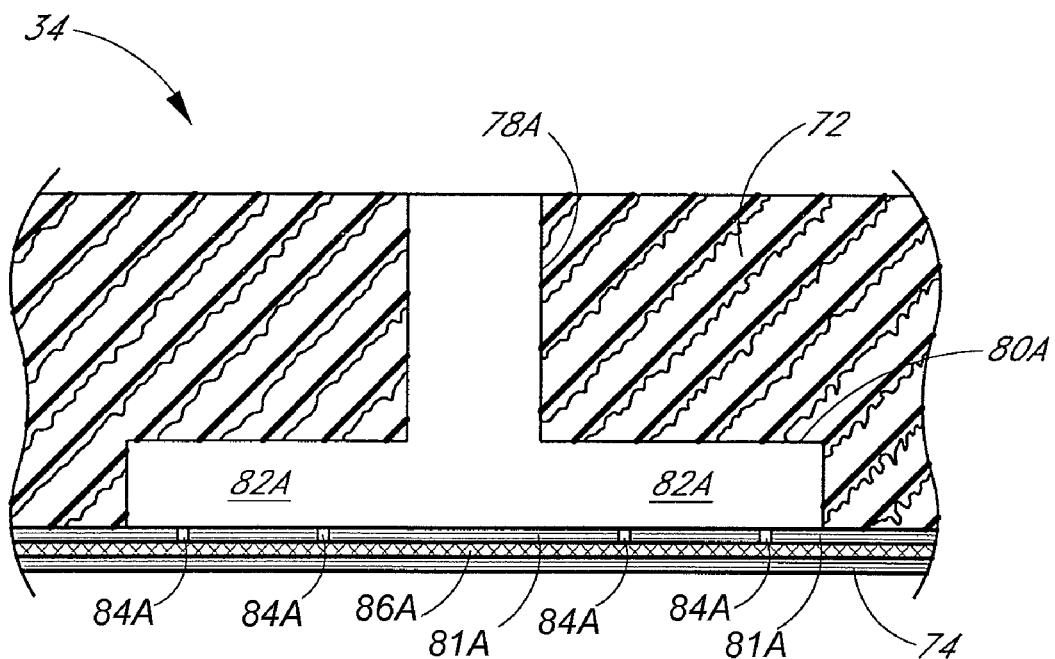
FIG. 2A is a cross-sectional view of the vehicle seat assembly of FIG. 1 taken along line 2A-2A of FIG. 2.

FIG. 2A is a cross-sectional view of a portion of the backrest 34. As shown, the backrest 34 is generally formed by a cushion 72, which is covered with an appropriate covering material 74 (e.g., upholstery). The cushion 72 is typically supported on a metallic frame (not shown). In some embodiments, springs may be positioned between the frame and the cushion 72. The frame provides the seat assembly 30 with structural support while the cushion 72 provides a soft seating surface. The covering material 74 provides an aesthetic appearance and soft feel to the surface of the seat assembly 30. The seat portion 32 may be constructed in a similar manner as the backrest 34.

Figure 3:
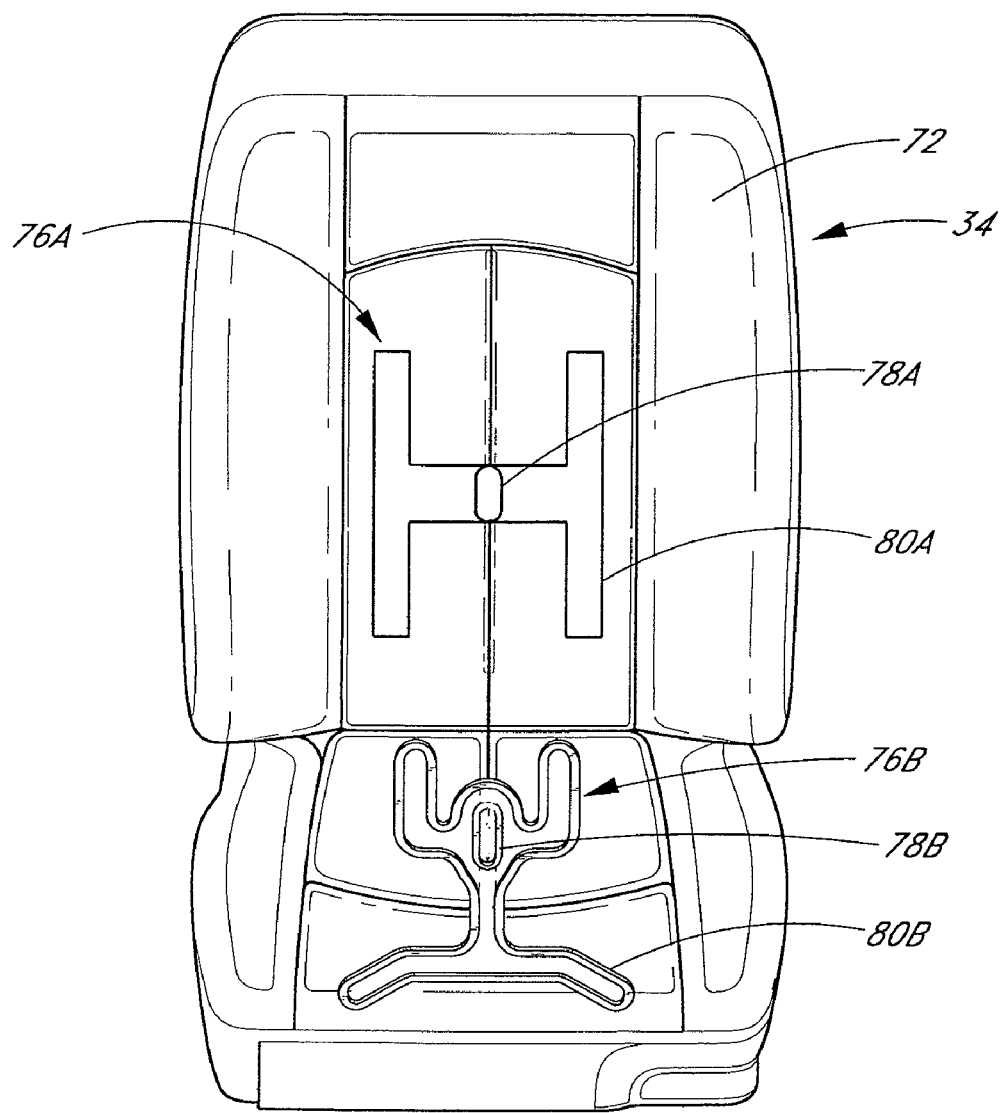
FIG. 3 is a front view of the vehicle seat assembly of FIG. 1 with a covering of the seat assembly removed.

FIG. 3 illustrates the seat assembly with the covering 74 removed thereby exposing the cushion 72. The cushion 72 can be a typical automotive seat cushion foam or other types of materials with suitable characteristics for providing support to an occupant. Such materials include, but are not limited to, closed or open-celled foam.

As shown in FIG. 3, the backrest 34 of the seat assembly 30 is provided with a backrest fluid distribution system 76A. The distribution system 76A comprises an inlet passage 78A through from the front side 54 to the rear side 56 of the seat cushion 72. (See also FIG. 2A). The distribution system 76A also includes at least one, and often, a plurality of channels 80A, which extend from the inlet passage 78A.

As mentioned above, the cushion 72 may be formed from a typical automotive cushion material, such as, for example, an open or closed cell foam. In one embodiment, the cushion 72 is made of foam that is pre-molded to form the passage 78A and/or the channels 80A. In another embodiment, the passage 78A and/or the channels 80A may be formed by cutting foam out of the seat cushion 72.

With reference back to FIG. 2A, the channels 80A are covered by a scrim 81A to define distribution passages 82A for transporting air through the seat assembly 30. The scrim 81A includes one or more openings 84A for delivering air to and/or from the distribution passages 82A. The scrim 81A may be formed of a material similar to the cushion 72. In the illustrated embodiment, the scrim 81A is attached to the cushion 72 in a manner that limits leakage between the scrim 81A and cushion 72 thereby directing the flow of air through the openings 84A. In one embodiment, an adhesive is used to attach the scrim 81A to the cushion 72. In other embodiments, a heat stake or fasteners may be used.

With continued reference to FIG. 2A, a distribution layer 86A is disposed between the scrim 81A and the seat covering 74. The distribution layer 86A spreads the air flowing through the openings 84A along the lower surface of the covering 74. To permit airflow between the distribution layer 86A and the spaces proximal to the front surface 48 of the backrest 34, the covering 74 may be formed from an air-permeable material. For example, in one embodiment, the covering 74 comprises an air-permeable fabric made of natural and/or synthetic fibers. In another embodiment, the covering is formed from a leather, or leather-like material that is provided with small openings or apertures.

Figure 2B:
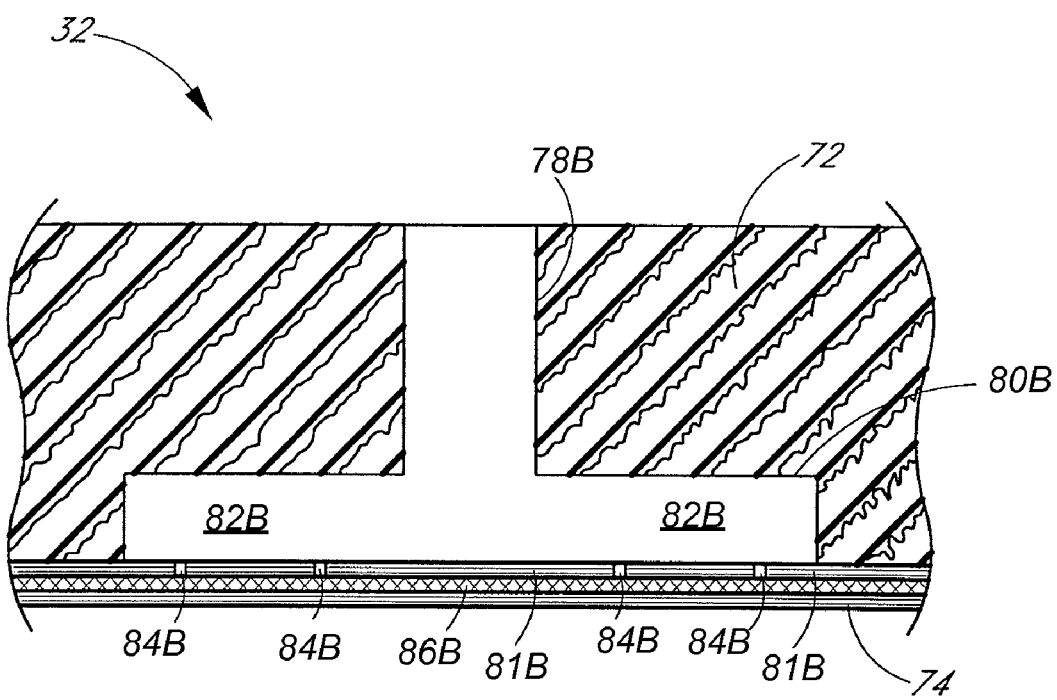
FIG. 2B is a cross-sectional view of the vehicle seat assembly of FIG. 1 taken along line 2B-2B of FIG. 2.

With reference to FIGS. 2B and 3, the seat 32 of the seat assembly 30 is provided with a seat cushion fluid distribution system 76B. The seat distribution system 76B also comprises an inlet passage 78B through from the top side 68 to the bottom side 70 of the seat cushion 72. As with the backrest distribution system 76A, the seat distribution system 76B also includes at least one, and often, a plurality of channels 80B, which extend from the inlet passage 78B. These channels 80B may be configured as described above.

In the seat distribution system 76B, the channels 80B are also covered by a scrim 81B to define distribution passages 82B for transporting air through the seat assembly 30. The scrim 81B includes one or more openings 84B for delivering air to and/or from the distribution passages 82B. As described above, the scrim 81B may be formed of a material similar to the cushion 72 and is preferably attached to the cushion 72 in a manner that limits leakage between the scrim 81B and cushion 72. A distribution layer 86B is disposed between the scrim 81B and the seat covering 74.

As will be explained in more detail below, in one embodiment, conditioned air is delivered to the distribution passages 82A, 82B through the inlet passages 78A, 78B. The air then flows through the openings 84A, 84B and into the distribution layer 86A, 86B. The air is then directed through the covering 74 to a space adjacent to the front surface 48 of the backrest 34 or the top surface 50 of the seat 32. In another embodiment, the climate control system 36 is used to remove air, which is adjacent to the front surface 48 of the backrest 34 and/or the top surface 50 of the seat 32. In such an embodiment, the air is withdrawn through the covering 74 and into the distribution layers 86A, 84B. The air is then withdrawn through the openings 84A, 84B, into the distribution passages 82A, 82B and through the inlet passage 78A, 78B.

Given the goal of distributing air through the cushion 72 and along the covering 74, those of skill in the art will recognize that the distribution systems 76A, 76B for the backrest 34 and the seat 32 may be modified in several different manners. For example, the shape and/or number of channels 80A, 80B may be modified. In other embodiments, the scrim 81A, 81B and/or distribution passages 82A, 82B may be combined and/or replaced with other components configured for similar functions. In yet another embodiment, a separate insert may be positioned within the channels 80A, 80B for distributing the air. See e.g., co-pending U.S. patent application Ser. No. 10/853,779, filed May 25, 2004, the entire contents of which are hereby incorporated by reference herein. In other embodiments, the distribution systems 76A, 76B or portions thereof may be combined with each other.

Figure 4:
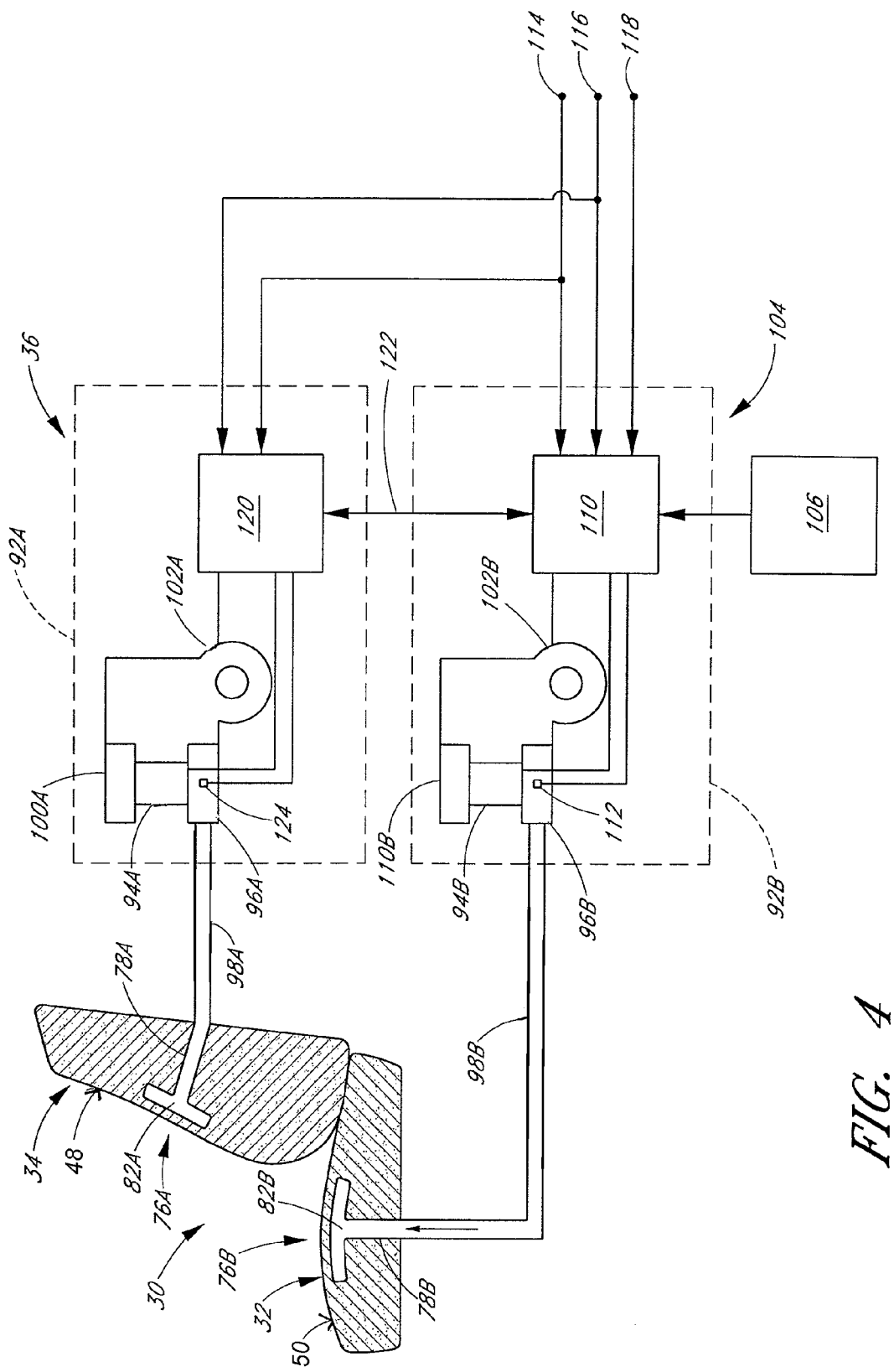
FIG. 4 is a schematic illustration of the vehicle seat assembly and climate control system of FIG. 1.

FIG. 4 is a schematic illustration of the climate control system 36. In the illustrated embodiment, the climate control system includes a back thermal module 92A and seat thermal module 92B. As will be explained below, both thermal modules 92A, 92B are configured to provide conditioned air (and/or to remove air in some embodiments) to the distribution systems 76A, 76B described above. In this manner, the thermal modules 92A, 92B provide a fluid flow to either warm or cool the front surface 48 of the backrest 34 and the top surface 50 of the seat portion 32 respectively. Specifically, the climate control apparatus 36 preferably provides conditioned air that is either heated or cooled relative to the temperature of the front surface 48 of the back rest 32 and the top surface 50 of the seat 32.

In the illustrated embodiment, the thermal modules 92A, 92B preferably each include a thermoelectric device 94A, 94B for temperature conditioning (i.e. selectively heating or cooling) the fluid flowing through the device 94A, 94B. A preferred thermoelectric device 94A, 94B is a Peltier thermoelectric module, which is well known in the art. The illustrated thermal modules 92A, 92B preferably also include a main heat exchanger 96A, 96B for transferring or removing thermal energy from the fluid flowing through the modules 92A, 92B and to the distribution systems 76A, 76B. Such fluid is transferred to the distribution systems 76A, 76B through conduits 98A, 98B (see e.g., U.S. application Ser. No. 10/973,947, filed Oct. 25, 2004, which is hereby incorporated by reference herein). The modules 92A, 92B also preferably include a waste heat exchanger 100A, 100B that extends from the thermoelectric device 94A, 94B generally opposite the main heat exchanger 96A, 96B. A pumping device 102A, 102B is preferably associated with each thermal module 92A, 92B for directing fluid over the main and/or waste heat exchangers 96A, 96B, 100A, 100B. The pumping devices 102A, 102B may comprise an electrical fan or blower, such as, for example, an axial blower and/or radial fan. In the illustrated embodiment, a single pumping device 102A, 102B may be used for both the main and waste heat exchangers 96A, 96B, 100A, 100B. However, it is anticipated that separate pumping devices may be associated with the waste and heat exchanges 96A, 96B, 100A, 100B.

It should be appreciated that the thermal modules 92A, 92B described above represents only one exemplary embodiment of a device that may be used to condition the air supplied to the distribution systems 76A, 76B. Any of a variety of differently configured thermal modules may be used to provide conditioned air. Other examples of thermal modules that may be used are described in U.S. Pat. No. 6,223,539, 6,119,463, 5,524,439 or 5,626,021, which are hereby incorporated by reference in their entirety. Another example of such a thermal module is currently sold under the trademark Micro-Thermal Module™ by Amerigon, Inc. In another example, the thermal module may comprise a pump device without a thermoelectric device for thermally conditioning the air. In such an embodiment, the pumping device may be used to remove or supply air to the distribution system 76A, 76B. In yet another embodiment, the thermal modules 92A, 92B, may share one or more components (e.g., pumping devices, thermoelectric devices, etc.) with the vehicles general climate control system.

In operation, fluid in the form of air can be delivered from the thermal modules 92A, 92B, through the conduits 98A, 98B to the distribution systems 76A, 76B. As described above, the air flows through the passages 82A, 82B, into the openings 84A, 84B and then along the distribution layer 86A, 86B and through the covering 74. In this manner, conditioned air can be provided to the front surface 48 of the backrest 34 and the top surface 50 of the seat 32.

In a modified embodiment, air from within the passenger compartment of the automobile can be drawn through the covering 74, into the distribution layer 86A, 86B and through the openings 84A, 84B. The air then can flow through the distribution passages 82A, 82B, into the inlet passage 78A, 78B and then into the conduit 98A, 98B. In this manner, the climate control system 36 can provide suction so that air near the surface of the seat assembly 30 is removed.

A control system 104 for the climate control system 36 will now be described with continued reference to FIG. 4. As shown, the control system 104 includes a user input device 106 through which the user of the climate control system 36 can provide a control setting or set mode for the climate control system 36. The control setting can comprise a specific temperature setting (e.g., 65 degrees), a more general temperature setting (e.g., "hot" or "cold"), and/or a setting for the pumping device (e.g., "high," "medium," or "low"). Depending upon the desired configuration, the input device 106 may include any of a variety of input devices, such as, for example, dials, buttons, levers, switches, etc. The user input device 106 may also include a user output that provides visual or audio indicia of the control setting (e.g., an LED display).

With continued reference to FIG. 4, the input device 106 is operatively connected to a seat control module 110, which in the illustrated embodiment is associated with the seat thermal module 92B. The seat control module 110 is, in turn, operatively connected to the pumping device 102B and the thermoelectric device 94B. In addition, a temperature sensor 112 is provided to measure the temperature of the fluid conditioned by the thermoelectric device 94B. The temperature sensor 112 is operatively connected to the seat control module 110. The seat control module 110 is preferably also operatively connected to a power source 114 and a ground source 116 and includes an appropriate power control unit to provide sufficient electrical capacity to operate all of the aforementioned devices (92B, 94B, 112) of the seat thermal module 92B. The seat control module 110 preferably also has a controller that is configured to receive the occupant inputs from the input device 106 and the temperature information from the temperature sensor 112. From this information, the seat control module 110 is configured to make adjustments to the operation of the thermoelectric device 94B and the fluid pump 102B according to a predetermined logic designed to ensure occupant comfort and to protect against system damage. Those of skill in the art will appreciate that the seat control module can comprise a hard-wired feed back control circuit, a dedicated processor or any other control device that can be constructed for performing the steps and functions described herein. In additions, the controller within the seat control module 110 may be combined or divided as deemed appropriate.

Various components are described as being "operatively connected" to the control unit. It should be appreciated that this is a broad term that includes physical connections (e.g., electrical wires) and non-physical connections (e.g., radio or infrared signals). It should also be appreciated that "operatively connected" includes direct connections and indirect connections (e.g., through an additional intermediate device).

The seat control module 110 optionally may also be configured to receive a signal from a vehicle control device 118 that indicates whether the vehicle's ignition has been turned on. In this manner, the seat control module 110 may be configured to allow operation of the thermal module 92B only if the vehicle's engine is running.

With continued reference to FIG. 4, the backrest thermal module 92A includes a backrest control module 120. As shown, the backrest control module 120 is operatively connected to the thermoelectric device 94A and the fluid pump 102A for the backrest 34. The backrest control module 120 is connected to the power source 114 and the ground source 116 and includes a controller configured to provide sufficient electrical capacity to operate the thermoelectric device 94A and the fluid pump 102A. As will be explained below, the backrest control module 120 is configured to receive a control signal from the seat control module 110. From this information, the backrest control module 120 operates the thermoelectric device 94B and the fluid pump 102B to ensure occupant comfort and safety, and protect against system damage. Those of skill in the art will appreciate that the backrest control module 120 can comprise a hard wired feed back control circuit, a dedicated processor or any other control device that can be constructed for performing the steps and functions described herein.

In the illustrated embodiment, a communication line 122 operatively connects the backrest control module 120 to the seat control module 110. In one embodiment, the seat control module 110 is configured to receive the inputs from the input device 106 to make adjustments to the operation of the thermoelectric device 94A and the fluid pump 96A in the backrest thermal module 92A according to a predetermined logic designed to ensure occupant comfort and safety, and protect against system damage. The control signals generated by the seat control module 110 are transmitted to the backrest control module 120 through the communication line 122.

The illustrated embodiment optionally includes a backrest temperature sensor 124 for measuring the temperature of the fluid that has been thermally conditioned by the backrest thermal module 92A. The information from this temperature sensor 124 may optionally be transmitted through the communication line 122 to the seat control unit 110. In such a configuration, the seat control unit 110 may be configured to use this temperature signal to generate the control signals transmitted to the backrest control unit 120. In yet another modified embodiment, the control unit 120 for the backrest 34 may be operatively connected directly to the input device 106 in a manner similar to that described above for the control unit 110 for the seat 32. An example of such an embodiment will be described in more detail below with reference to FIG. 7. It should also be appreciated that the control unit 120 for the backrest 34 may be operatively connected to the power source 114 and the ground source 116 through the communication line 122.

In the above description, the control units 110, 120 are described as being associated with the "back" or "seat" cushion. In modified embodiments, it should be appreciated that the features of the back and seat controllers may be reversed. That is, the backrest control module 120 may be configured to interpret the signals from the user input device 106 and to control the seat control module. However, the above-described arrangement is generally preferred because in most applications there is generally more room in the seat cushion 32 for various electrical connections that are described above. In still other embodiments, the features of the back and seat controllers may be applied to different zones of a seat, such as, for example, a top and bottom portion of a backrest. In other embodiments, the features of the back and seat controllers may be applied to different zones of an occupant area that are to be thermally conditioned, such as, for example, back and rear seat assemblies or left and right seat assemblies.

Figure 5:
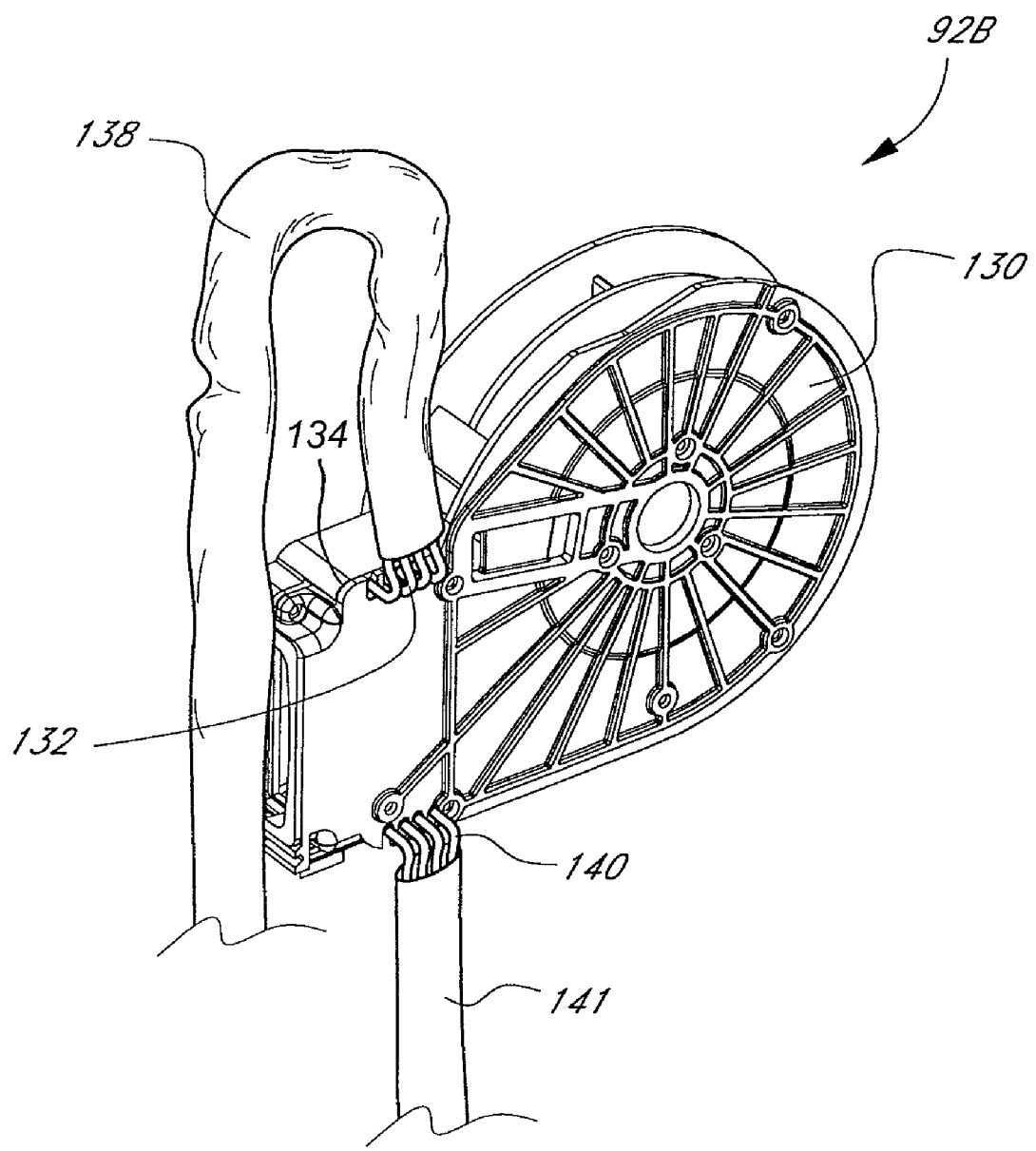
FIG. 5 is a perspective view of a thermal module of the climate control system of FIG. 1.

In a preferred embodiment, the backrest control unit 120 and/or the seat control unit 110 are generally coupled to the other components of their respective thermal modules 92A, 92B and, more preferably, disposed substantially within the same housing or protective casing 130 which contains the thermoelectric device 94A, 94B and fluid pumps 102A, 102B. FIG. 5 is an illustration of an exemplary cushion thermal unit 92B, which includes a casing 130 that generally surrounds the thermoelectric device 94B and fluid pump 102B. The casing 130 preferably also surrounds the seat control module 110. Electrical wires 132 are operatively connected to the seat control module 110 and extend through an opening 134 in the casing 130. In the illustrated embodiment, the electrical wires 132 provide the operational connection to the input device 106, power source 114, ground source 116 and/or engine control unit 118. An electrical connector (not shown) may be provided at one end of the electrical wires 132 for providing a convenient connection point. The electrical wires may be positioned within a protective tube 138 to form what is often referred to in the art as a "pig tail."

With continued reference to FIG. 5, another set of electrical wires 140 may be used to form the communication line 122 between the seat control unit 110 and the backrest control unit 120. These electrical wires 140 preferably also extend from an opening in the casing 130. These wires 140 may be positioned within a protective tube 141 to form a "pig tail." The electrical wires 140 may also provide the connection between the backrest control module 120 and the power source 114 and ground source 116.

The above described embodiments have several advantages. For example, there are no physically separate independent controllers for controlling the back and seat thermal modules 92A, 92B as is typically found in the prior art. This reduces the amount of space required by the climate control system 36 and reduces the complexity of the overall system design. Advantageously, the system 36 also requires fewer connections between various components. As described above, the prior art often required seven or more electrical connections that extend between the intermediate controller and the thermal modules 92A, 92B. The illustrated embodiment significantly reduces the number of these connections, thereby decreasing the complexity of the system, which reduces installation time and saves space.

Figure 6:
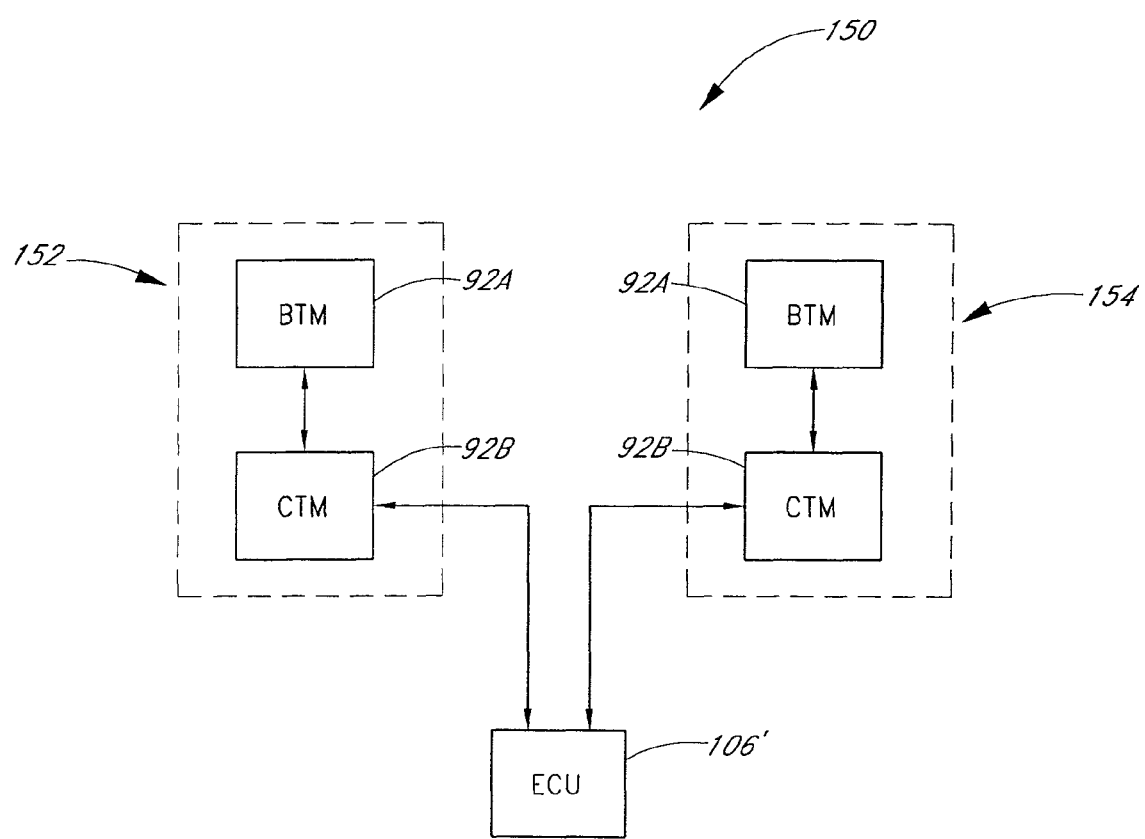
FIG. 6 is a schematic illustration of another embodiment of a climate control system.

FIG. 6 illustrates a climate control system 150 which is configured to control the climates of two seat assemblies 152, 154. As shown, the system 150 includes a back and seat thermal modules 92A, 92B as described below for each seat. The seat thermal modules 92B of each seat are operatively connected to an input device 106', which may include appropriate user interface such that the user may select the desired climate control for each seat. Those of skill in the art will recognize that the above-described system may be expanded to three, four or more seats and/or seats of different configurations and/or having more than two thermal units associated with each seat.

Figure 7:
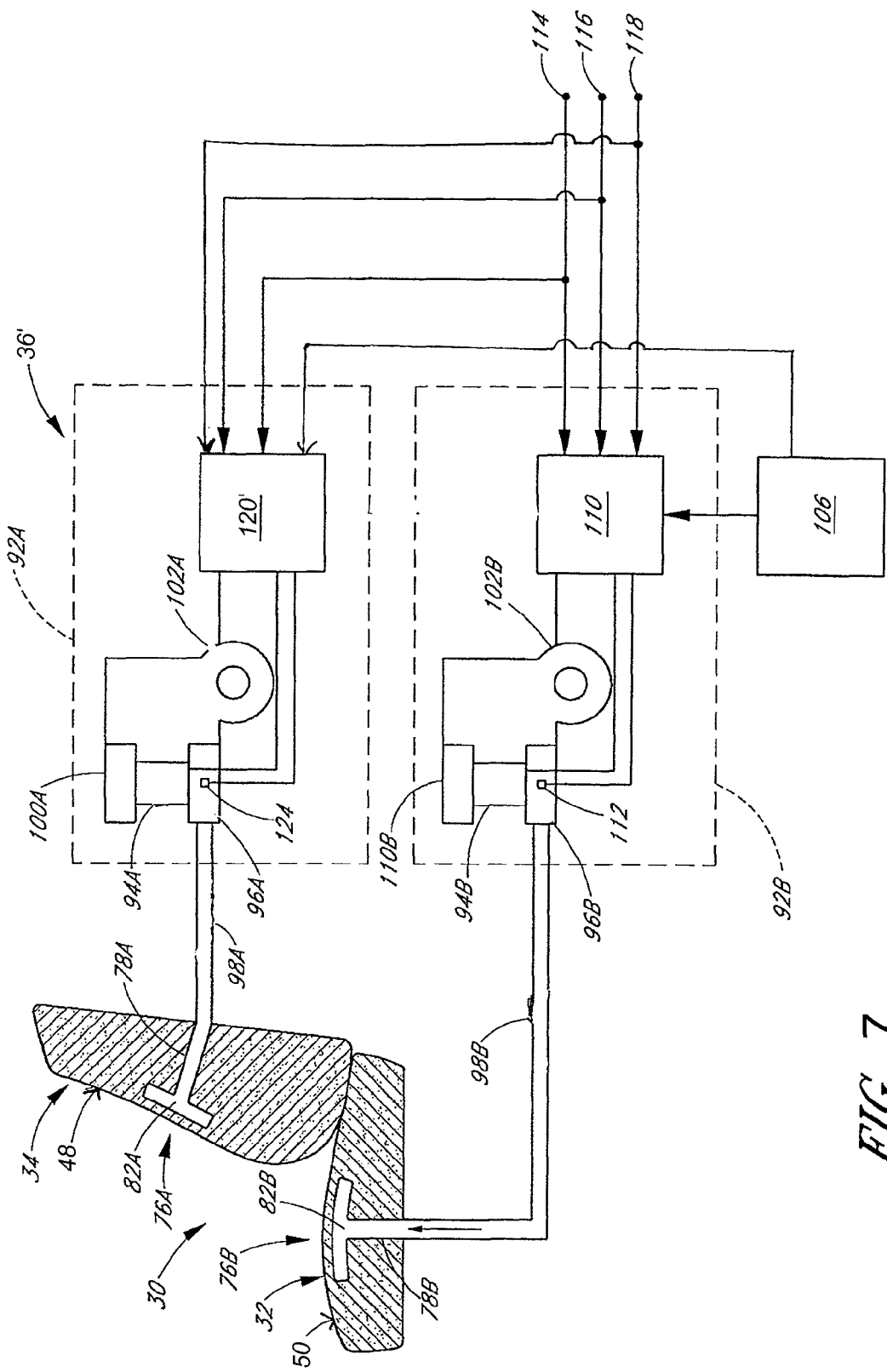
FIG. 7 is a schematic illustration the vehicle seat assembly of FIG. 1 with a modified embodiment of a climate control system.

FIG. 7 illustrates a modified embodiment of a climate control system 36'. In FIG. 7, like elements to those shown in FIG. 4 are designated with the same reference numbers used in FIG. 4. In addition, only certain elements of the climate control system 36' will be described in detail below. For those elements not described in detail, reference may be made to the previous detailed description of those elements.

As with the embodiment shown in FIG. 4, the climate control system 36' includes a user input device 106 through which the user of the climate control system 36' can provide a control setting or set mode for the climate control system 36'. As will be explained below, in this embodiment, the user input device 106 is operatively connected to both the seat control module 110 and the back control module 120'.

The seat control module 110 is operatively connected to the pumping device 102B and the thermoelectric device 94B. In addition, a temperature sensor 112 is provided to measure the temperature of the fluid conditioned by the thermoelectric device 94B. The temperature sensor 112 is operatively connected to the seat control module 110. The seat control module 110 is preferably also operatively connected to a power source 114 and a ground source 116 and includes an appropriate power control unit to provide sufficient electrical capacity to operate all of the aforementioned devices (92B, 94B, 112) of the seat thermal module 92B. The seat control module 110 may also be operatively connected to a vehicle control device 118 that indicates whether the vehicle's ignition has been turned on. As described above with reference to FIG. 4, the seat control module 110 preferably also has a controller that is configured to receive the occupant inputs from the input device 106 and the temperature information from the temperature sensor 112. From this information, the seat control module 110 can make adjustments to the operation of the thermoelectric device 94B and the fluid pump 102B according to a predetermined logic designed to ensure occupant comfort and to protect against system damage.

As mentioned above, in this embodiment, the back control unit 120' is also operatively connected to the user input device 106. The back control module 120', in turn, is operatively connected to a pumping device 102A and a thermoelectric device 94A. In addition, a temperature sensor 124 may be provided to measure the temperature of the fluid conditioned by the thermoelectric device 94A. The temperature sensor 124 is operatively connected to the back control module 120'. The back control module 120' is preferably also operatively connected to the power source 114 and the ground source 116 and includes an appropriate power control unit to provide sufficient electrical capacity to operate all of the aforementioned devices (92A, 94A, 124) of the back thermal module 92A. As with the seat control module 110, the back control module 120' preferably has a controller that is configured to receive the occupant inputs from the input device 106 and the temperature information from the temperature sensor 124.

From this information, the back control module 120' makes adjustments to the operation of the thermoelectric device 94A and the fluid pump 102A according to a predetermined logic designed to ensure occupant comfort and to protect against system damage.

In a preferred embodiment, the backrest control unit 120 and/or the seat control unit 110 are generally coupled to the other components of their respective thermal modules 92A, 92B and, more preferably, disposed substantially within the same housing or protective casing which contains the respective thermoelectric device 94A, 94B and fluid pumps 102A, 102B.

In one embodiment, the back control module 120' and the seat control module 110 are substantially similar such that the thermal modules 92A, 92B are also substantially similar. Such an arrangement allows for the same type of thermal module to be used for both the seat and back cushions 32, 34, while consequentially reducing costs associated with inventory and production as compared to a system that utilizes two different types of thermal modules. In addition, as with the embodiment of FIG. 3, there are no physically separate independent controllers for controlling the back and seat thermal modules 92A, 92B as is typically found in the prior art. This reduces the amount of space required by the climate control system 36' and reduces the complexity of the overall system design. Advantageously, the system 36' also requires fewer connections between various components. As described above, the prior art often required seven or more electrical connections that extend between the intermediate controller and the thermal modules 92A, 92B. The illustrated embodiment significantly reduces the number of these connections, thereby decreasing the complexity of the system, which reduces installation time and saves space.

To assist in the description of the disclosed embodiments, words such as upward, upper, downward, lower, vertical, horizontal, upstream, and downstream have and used above to describe the accompanying figures. It will be appreciated, however, that the illustrated embodiments can be located and oriented in a variety of desired positions.

Although the foregoing description of the preferred embodiments has shown, described, and pointed out certain novel features, it will be understood that various omissions, substitutions, and changes in the form of the detail of the apparatus as illustrated, as well as the uses thereof, may be made by those skilled in the art without departing from the spirit of this disclosure. Consequently, the scope of the present invention should not be limited by the foregoing discussion, which is intended to illustrate rather than limit the scope of the invention.

What is claimed is:

1. A thermal module configured for use with a climate-controlled seat assembly, comprising:
a housing defining a generally enclosed interior space, said housing comprising a fluid inlet and a fluid outlet;
a thermoelectric device;
a plurality of heat exchange members in thermal communication with the thermoelectric device;
a fluid transfer device configured to transfer a fluid from the fluid inlet to the fluid outlet at least partially through the heat exchange members in order to selectively heat or cool the fluid;
at least one sensor configured to sense a temperature condition and to provide a corresponding temperature signal; and
a controller operatively connected to the sensor, said controller configured to control at least one of the thermoelectric device and the fluid transfer device based at least in part on the temperature signal;
wherein the thermoelectric device, the heat exchange members, the fluid transfer device and the controller are situated within the enclosed interior space of the housing; and
wherein the thermal module is configured for use in a climate-controlled seat assembly with no physically separate independent controllers for controlling the thermal module.

2. The thermal module of claim 1, wherein the housing further comprises an opening, the opening being configured to connect at least one wire from outside the housing to the controller.

3. The thermal module of claim 2, wherein the at least one wire is electrically connected to at least one of the sensor, a power source and a user input device.

4. The thermal module of claim 1, wherein the fluid outlet is configured to be placed in fluid communication with a fluid distribution system of a climate-controlled seat assembly.

5. The thermal module of claim 4, wherein the fluid distribution system comprises at least one channel or passage formed in a cushion of the climate-controlled seat assembly.

6. The thermal module of claim 1, wherein the climate-controlled seat assembly comprises a vehicle seat.

7. The thermal module of claim 1, wherein the climate-controlled seat assembly comprises a mattress.

8. A conditioning device for selectively providing thermally-conditioned air to a climate-controlled seat assembly, comprising:
a protective casing having at least one fluid inlet and at least one fluid outlet, said protective casing defining an enclosed interior space;
a thermoelectric device;
first heat exchangers in thermal communication with a first side of the thermoelectric device;
second heat exchangers in thermal communication with a second side of the thermoelectric device, said second side being generally opposite of the first side of the thermoelectric device;
a fluid pump configured to transfer a fluid from the at least one fluid inlet to the at least one fluid outlet at least partially through the first or second heat exchangers to selectively heat or cool the fluid exiting the at least one fluid outlet; and
a controller for selectively controlling at least one of the thermoelectric device and the fluid pump; and
at least one opening in the protective casing, said opening configured to connect at least one wire from outside the protective casing to the controller;
wherein the thermoelectric device, the first and second heat exchange members, the fluid pump and the controller are situated within the enclosed interior space of the protective casing; and
wherein the device does not require another physically separate independent controller in order to control the thermoelectric device or the fluid pump.

9. The conditioning device of claim 8, wherein the controller is operatively connected to a user input device, said user input device configured to permit a user to select a control setting or operational mode for the conditioning device.

10. The conditioning device of claim 8, further comprising at least one sensor configured to sense a temperature condition within the enclosed interior space and to provide a corresponding temperature signal, said at least one sensor being operatively connected to the controller.

11. The conditioning device of claim 8, wherein the at least one wire is electrically connected to a power source.

12. The conditioning device of claim 8, wherein the device is positioned within or on a climate-controlled seat assembly and wherein the at least one fluid outlet is in fluid communication with a fluid distribution system of said climate-controlled seat assembly.

13. The conditioning device of claim 12, wherein the fluid distribution system comprises at least one channel or passage formed in a cushion of the climate-controlled seat assembly.

14. The conditioning device of claim 8, wherein the climate-controlled seat assembly comprises a vehicle seat or a mattress.

15. A climate controlled seat assembly comprising:
   at least one cushion;
   a thermal module comprising:
      a protective housing separate and independent from the cushion, said protective housing having a fluid inlet and a fluid outlet, said protective housing defining an interior space;
      a thermoelectric device;
      a plurality of heat exchange members in thermal communication with the thermoelectric device;
      a fluid transfer device configured to transfer a fluid from the fluid inlet to the fluid outlet through or near the heat exchange members to selectively heat or cool the fluid; and
      a control module configured to control at least one of the thermoelectric device and the fluid transfer device based, at least in part, on a temperature signal generated by a sensor positioned within the interior space of the protective housing;
      wherein the thermoelectric device, the fluid transfer device and the control module are at least partially situated within the interior space of the protective housing; and
   a fluid distribution system comprising at least one channel and an inlet passage, said inlet passage being in fluid communication with the fluid outlet of the thermal module;
   wherein the fluid distribution system is positioned at least partially within the at least one cushion of the climate controlled seat assembly;
   wherein thermally conditioned fluid entering the fluid distribution system is configured to be distributed toward a seated occupant of the climate controlled seat assembly; and
   wherein the thermal module can be installed in the seat assembly and can be properly operated without the need for an independent control unit that is physically separated from the protective housing.

16. The seat assembly of claim 15, further comprising a user input device, the user input device being operatively connected to the control module of the thermal module.

17. The seat assembly of claim 15, further comprising a second thermal module, the second thermal module configured to selectively provide thermally conditioned fluid to a different part of the climate controlled seat assembly.

18. The seat assembly of claim 15, wherein the thermoelectric device comprises a Peltier circuit and the fluid transfer device comprises a fan.

19. The seat assembly of claim 15, wherein the climate-controlled seat assembly comprises a vehicle seat.

20. The seat assembly of claim 15, wherein the cushion comprises a mattress.

21. The thermal module of claim 1, wherein the controller is configured to adjust the operation of the thermoelectric device and the fluid transfer device based upon predetermined logic.

22. The thermal module of claim 21, wherein the controller comprises a single controller configured to adjust operation of the thermoelectric device and the fluid transfer device based upon predetermined logic.

23. The thermal module of claim 21, wherein the predetermined logic uses the temperature signal and an occupant input to adjust the operation of the thermoelectric device and the fluid transfer device.

24. The thermal module of claim 23, wherein the occupant input includes a temperature setting.

25. The thermal module of claim 1, further comprising a power control unit configured to provide electrical capacity to the thermoelectric device and the fluid transfer device.

26. The conditioning device of claim 8, wherein the controller is configured to adjust the operation of the thermoelectric device and the fluid pump based upon predetermined logic.

27. The conditioning device of claim 26, wherein the controller comprises a single controller configured to adjust operation of the thermoelectric device and the fluid pump device based upon predetermined logic.

28. The conditioning device of claim 26, wherein the predetermined logic uses a temperature signal and an occupant input to adjust the operation of the thermoelectric device and the fluid pump.

29. The conditioning device of claim 28, wherein the occupant input includes a temperature setting.

30. The conditioning device of claim 8, further comprising a power control unit configured to provide electrical capacity to the thermoelectric device and the fluid pump.

31. The climate controlled seat assembly of claim 15, wherein the control module is configured to adjust the operation of the thermoelectric device and the fluid transfer device based upon predetermined logic.

32. The climate controlled seat assembly of claim 31, wherein the control module comprises a single controller configured to adjust operation of the thermoelectric device and the fluid transfer device based upon predetermined logic.

33. The climate controlled seat assembly of claim 31, wherein the predetermined logic uses the temperature signal and an occupant input to adjust the operation of the thermoelectric device and the fluid transfer device.

34. The climate controlled seat assembly of claim 33, wherein the occupant input includes a temperature setting.

35. The climate controlled seat assembly of claim 15, further comprising a power control unit configured to provide electrical capacity to the thermoelectric device and the fluid transfer device.

36. The climate controlled seat assembly of claim 15, further comprising at a second seat cushion and a second thermal module associated with the seat cushion, the second thermal module comprising:
   a protective housing separate and independent from the cushion, said protective housing having a fluid inlet and a fluid outlet, said protective housing defining an interior space;
   a thermoelectric device;
   a plurality of heat exchange members in thermal communication with the thermoelectric device;
   a fluid transfer device configured to transfer a fluid from the fluid inlet to the fluid outlet through or near the heat exchange members to selectively heat or cool the fluid; and
   wherein the thermoelectric device, the fluid transfer device and the control module are at least partially situated within the interior space of the protective housing.

* * * * *